Aug. 18, 1925.
F. B. PARDEY
ANCHOR
Filed Oct. 17, 1923
1,550,451
2 Sheets-Sheet 1
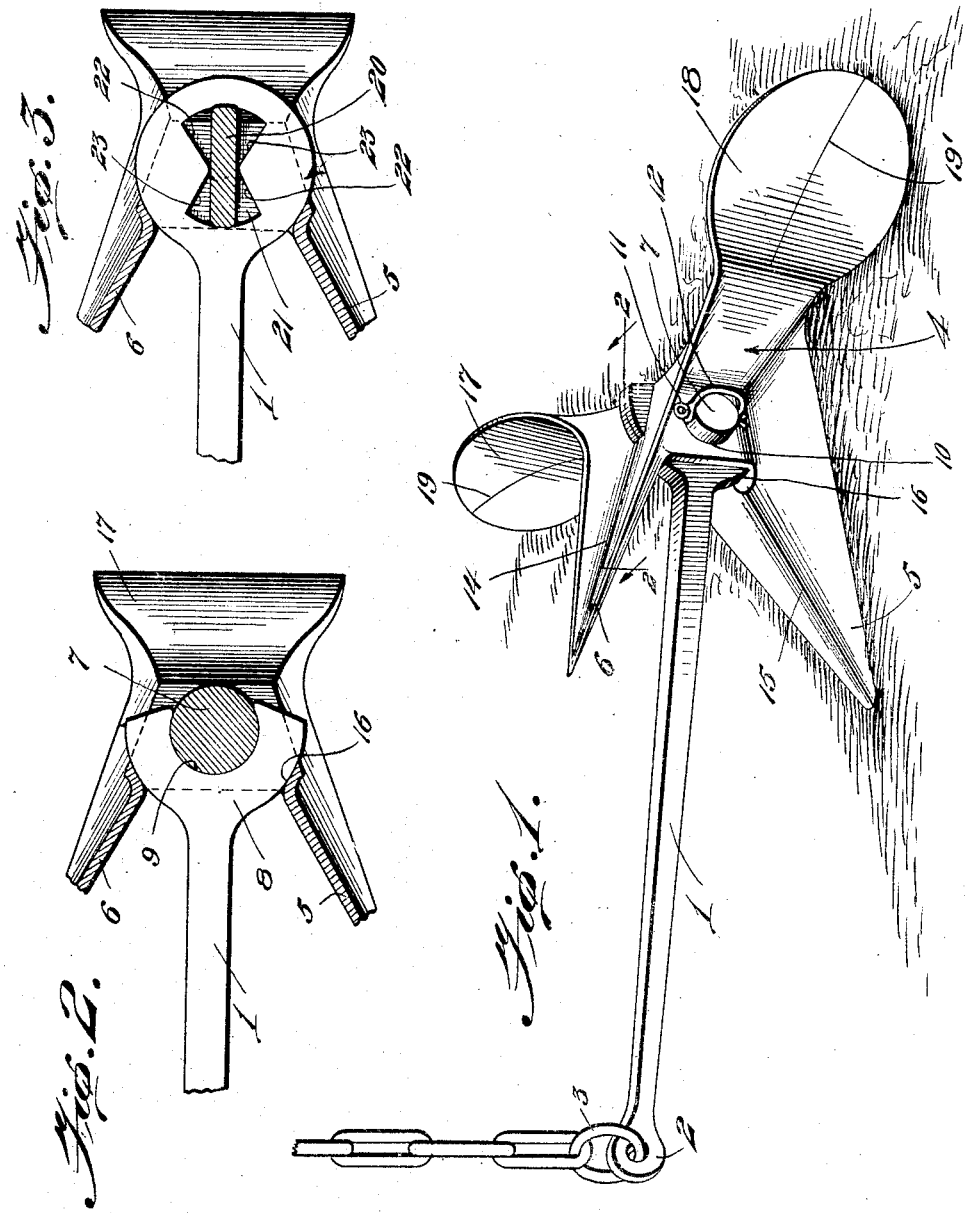
Inventor
Frank B. Pardey
By Perley H. Plant
Attorney Aug. 18, 1925.
F. B. PARDEY
1,550,451
ANCHOR
Filed Oct. 17, 1923      2 Sheets-Sheet 2
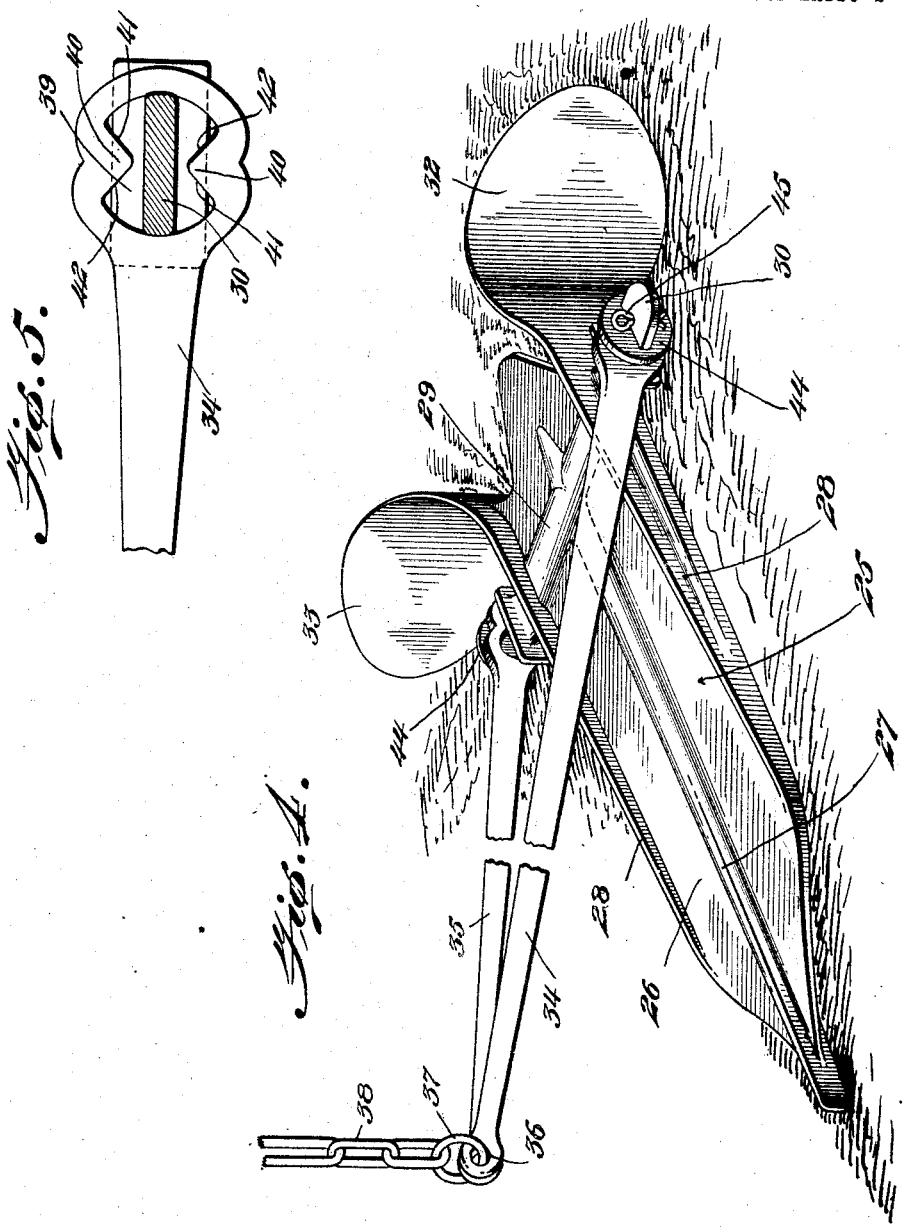

Patented Aug. 18, 1925.

1,550,451

UNITED STATES PATENT OFFICE.

FRANK B. PARDEY, OF WARREN, RHODE ISLAND.

ANCHOR.

Application filed October 17, 1923. Serial No. 669,041.

*To all whom it may concern:*

Be it known that I, FRANK B. PARDEY, a citizen of the United States, residing at Warren, in the county of Bristol and State of Rhode Island, have invented certain new and useful Improvements in Anchors, of which the following is a specification.

This invention relates to an improved anchor of the type which comprises a fluke pivotally mounted upon a shank or frame member for engagement with the ground.

One object of the invention is to provide a device of the character described provided with a ground engaging fluke and means for insuring such positioning of the fluke relative to the surface of the ground as will insure a proper and adequate embedding of the fluke when drawn along upon the surface of the ground. Another object of the invention is the provision of novel means extending outwardly and rearwardly of the fluke in an angular direction with respect to the plane of movement of the fluke for directing the fluke into ground engaging position.

Another object of the invention is the provision of a novel form of head piece comprising a fluke and means for directing the movement of the same.

Other objects and advantages of the invention relate to certain improved details of arrangement and manner of proportioning and forming the several parts as will be more fully set forth in the following description.

Referring to the drawings:

Fig. 1 is a perspective view of one form of the invention.

Fig. 2 is a detail sectional view taken along the line 2—2 of Fig. 1 showing the pivotal connection between the shank and head piece.

Fig. 3 is a detail view similar to Fig. 2 and showing a modified form of pivotal connection.

Fig. 4 is a perspective view of a modified form of the invention, and,

Fig. 5 is a detail view of the pivotal connection between the head piece and frame as shown in Fig. 4.

In the accompanying drawings 1 designates a shank which may be provided at the end 2 with a ring 3 or other suitable means for attaching the same to a cable while the opposite end thereof is pivotally connected to a head piece 4 in such a manner as to permit of limited pivotal movement between the shank and head piece. The head-piece 4 is in the present instance provided with a pair of ground engaging flukes 5 and 6 located upon opposite sides of the shank 1 and movable towards and from the shank by reason of the pivotal connection between the shank and head-piece. The means for pivotally connecting the shank and head-piece comprises a pivot bar or shaft 7 which may be formed integral with a portion of the head-piece or formed separately therefrom and secured thereto by bolts or other equivalent fastening devices.

The end 8 of the shank which makes the pivotal connection with the head-piece is enlarged as shown and provided with a bearing portion 9 for the reception of the pivot bar. In the present instance the pivot bar 7 is shown as being formed separate from the head-piece and passed through openings 10 formed in the head-piece where it is secured by a cotter pin 11 to which is attached a D-ring 12 for connecting a light cable for use in breaking out the anchor.

While this manner of positioning the pivot bar is shown as one which may be employed other suitable methods may be employed, such, for example, as the forming of a channel in the head-piece and inserting the pivot bar from the rear using bolts or other fastening means for retaining the same in place. As shown in Fig. 2 the pivot bar may be circular in cross-section to fit in the bearing 9 in the head 8, the pivotal movement of the head-piece relative to the head being limited by the shank contacting with one of the flukes 5 and 6. Each of the flukes 5 and 6 is tapered towards the point and the side contacting with the ground is hollowed out as indicated at 14 to produce a slight suction effect and assist in drawing the fluke deeper into the surface of the ground. The opposite face of each fluke may be rounded slightly as indicated at 15 which also makes the same more readily embedded in the surface. As shown in Figs. 1 to 3 of the drawings the head-piece 4 is provided with an opening 16 extending therethrough within which the enlarged end 8 of the shank is positioned to permit limited pivotal movement of the head-piece relative to the shank. From the manner of pivoting the head-piece to the shank it will be seen that in the pivotal movement of the head-piece relative to the shank the flukes move in a plane located at substantially right angles to the pivot bar.

Wings 17 and 18 extend outwardly and rearwardly from the head-piece in a direction opposed to the general direction of the flukes, being curved slightly as shown and a plane passed through the center lines 19—19' of the wings and the pivotal axis of the head-piece is located at substantially right angles to the plane of movement of the flukes. The wings may be inclined slightly outwardly from their center lines to better assist the embedding of the flukes in the surface of the ground.

In the form of connecting means shown in Fig. 3 of the drawings, that portion of the pivot bar which is engaged by the shank is substantially rectangular as indicated at 20 and the enlarged end of the shank is circular in its external contour but is cut away to form a double segmental opening 21 for the reception of the bar 20. The opening 21 which serves as a bearing for the pivot bar 20 is so formed as to provide a plurality of shoulders or stops 22 and 23 for engagement with the sides of the pivot bar 20 to limit the degree of movement of the head-piece relative to the shank. The stops 22 engage opposite sides of the bar 20 to limit movement of the head-piece relative to the shank in one direction while the movement of the head-piece relative to the shank in the opposite direction is limited by the stops 23.

In the assembling of the parts shown in Figs. 1 to 3, the shank may be placed in position and the pivot bar inserted by passing it through the openings 10 and into position relative to the shank, where when the pivot bar is secured, it is held against forward movement by engagement with portions of the head-piece and against moving rearwardly by the pivot bar and its securing means. In the operation of the structure above described the wings 17 and 18 insure the proper positioning of the head-piece for the engagement of one of the flukes with the surface of the ground and a pull exerted upon the shank draws the point of the fluke resting upon the surface downwardly until the same is sufficiently embedded to serve as a firm holding means. As the fluke is drawn deeper into the ground the surface of the wings assumes a position more nearly horizontal relative to the surface and thus tends by engagement with the surface to embed the fluke more deeply.

When however it is desired to break out the anchor the wings press against the surface and act as fulcrums for the application of the force exerted upon the shank to assist in removing the embedded fluke. The inclined surface 15 of each fluke renders the same more easily broken from the ground.

In the modification of the invention shown in Figs. 4 and 5 of the drawings 25 designates a head-piece which comprises a relatively thin elongated portion 26 having a central longitudinal rib 27, thickened edge portions 28 and a transverse rib 29 terminating in flattened lugs 30 which project outwardly from opposite sides of the elongated portion 26 and serve as means for securing the head-piece to a frame. Extending outwardly and rearwardly from the head-piece 25 are a pair of wings 32 and 33, the direction of said wings being opposed to the direction of the fluke relative to the axis of the head-piece and diverging from the plane of movement of said fluke about said axis. A pair of frame members 34 and 35 of similar form comprise the frame portion, each of said frame members being provided at one end with an opening 36 for the reception of a ring 37 which connects the ends of the frame members and serves as a means for attaching a cable 38.

Each of the frame members is provided at its opposite end with an opening 39 which serves as a bearing for one of the lugs 30. The opening 39 in each frame member is generally circular in outline broken by oppositely located inwardly extending stops 40 having cooperating faces 41 and 42 for engaging opposite sides of the lug 30 to limit the pivotal movement of the head-piece relative to the frame. Washers 44 may be placed over the lugs 30 and pins 45 passed therethrough to hold the frame members against removal.

As will be understood from the above description when taken in connection with the structure shown in the drawings, the head-piece is pivotally secured to the frame for movement about an axis substantially coincident with the rib 29, and the movement of the head-piece relative to the frame is limited in each direction by the stops 41 and 42 contacting with the lugs 30. The fluke extends radially from the pivotal axis of the head-piece and its plane of movement is at substantially right angles to the axis. The wings 32 and 33 extending outwardly and rearwardly from the head-piece in a direction substantially opposed to the direction of the fluke relative to the pivotal axis, the center lines of said wings being substantially transverse of the plane of movement of the head-piece about its axis, results in the anchor occupying such position on the surface that the fluke will be in position to engage the surface at all times.

As pull is exerted upon the cable the point of the fluke is drawn into the ground the wings acting to increase the penetration of the fluke as the head-piece is tilted.

What I claim is:—

1. An anchor comprising a shank, a head-piece pivotally secured to said shank and provided with a pair of ground engaging flukes located upon opposite sides of said shank and in the plane of movement of said shank relative to said head-piece, the said flukes tapering from base to point throughout their extent, and wings carried by said head-piece and extending outwardly therefrom and inclined rearwardly at an acute angle to the plane of movement of said head-piece relative to said shank.

2. An anchor comprising a shank, a head-piece pivotally secured to said shank and provided with substantially straight ground engaging flukes lying in the plane of pivotal movement of said shank relative to said head-piece, and wings carried by said head-piece and extending outwardly and rearwardly from the point of pivotal connection of said head-piece to said shank in a diagonal direction generally transversely of the plane of movement of said head-piece relative to said shank.

3. An anchor comprising a shank, a head-piece pivotally secured to said shank and provided with a relatively broad ground engaging fluke having the side thereof adapted to engage the surface of the ground recessed to facilitate its entry into the ground and to exert a suction action therewith to prevent its accidental separation therefrom, and oppositely positioned wings carried by said head-piece extending rearwardly of and diverging from the plane of movement of said fluke.

4. An anchor comprising a shank, a head-piece pivotally secured to said shank and provided with a pair of relatively broad ground engaging flukes extending divergently therefrom and both lying in the plane of movement of the shank relative to said head-piece, each fluke being tapered from base to point and having the side engaging the ground recessed to facilitate its entry into the ground and exert a suction effect therewith to prevent its accidental separation therefrom, and oppositely positioned wings carried by said head-piece extending rearwardly and diverging from the plane of movement of said flukes.

5. An anchor comprising a shank, a head-piece, pivotally secured to said shank and provided with a pair of relatively broad ground engaging flukes angular in cross-section, the sides thereof adapted to engage the ground being recessed to exert a suction effect therewith whereby accidental separation of the fluke from the ground is substantially prevented, and a pair of wings extending rearwardly from the head-piece and inclined outwardly and rearwardly from the plane of movement of said flukes relative to said shank.

In testimony whereof I have affixed my signature.

FRANK B. PARDEY.